United States Patent [19]
Leistner

[11] 3,916,273
[45] Oct. 28, 1975

[54] ELECTRIC MACHINE HAVING POLES SWITCHABLE FOR OPERATION AT FREQUENCIES OF 50 HZ AND 60 HZ

[75] Inventor: Werner Leistner, Berlin, Germany

[73] Assignee: Siemens Aktiengesellschaft, Munich, Germany

[22] Filed: Dec. 5, 1974

[21] Appl. No.: 529,724

[30] Foreign Application Priority Data
Jan. 14, 1974 Germany.......................... 2402013

[52] U.S. Cl................ 318/165; 318/189; 318/775 R
[51] Int. Cl.²...................................... H02K 19/02
[58] Field of Search..... 318/165, 189, 224 R, 225 R

[56] References Cited
UNITED STATES PATENTS
| | | |
|---|---|---|
| 3,140,637 | 7/1964 | Frenk et al...................... 318/225 R |
| 3,419,905 | 12/1968 | Letter................................ 318/165 |
| 3,611,084 | 10/1971 | Kent................................ 318/225 R |

*Primary Examiner*—G. Z. Rubinson
*Attorney, Agent, or Firm*—Kenyon & Kenyon Reilly Carr & Chapin

[57] ABSTRACT

An electrical synchronous machine having a slotted stator and having a rotor equipped with salient poles which are adjustable in number to enable the machine to operate at 50 and 60 Hz is equipped with an improved stator winding. The number of poles for each of these frequencies defines a corresponding pole pitch. The improved stator winding is a switchable stator winding having a plurality of coils arranged in the slots of the stator so as to be two coil sides deep thereby defining a two-layer symmetrical three-phase winding wherein the number of slots per pole per phase, q, is given by:

$$q = \frac{z}{n}(n \geq 1)$$

where the numerator, z, is selected so as to be dividable by 6 without remainder for 50 Hz operation and by 5 without remainder for 60 Hz operation, and wherein at least one of the following conditions is satisfied:

a. the number of slots per pole approximates 10 for 60 Hz operations and 12 for 50 Hz operations; and, b. approximates 5 for 60 Hz operations and 6 for 50 Hz operation.

The stator winding has winding heads at each end of the machine and each of the winding heads is made up of conductor rods having an inclination defining a winding pitch corresponding to the mean value of the pole pitch for 50 Hz operation and the pole pitch for 60 Hz operation. Each of the slots contains an upper conductor rod and a lower conductor rod defining the coil sides disposed therein, the upper conductor rods being respectively connected to the lower conductor rods, at least at one end of the machine, so as to deviate from the winding pitch corresponding to the above-mentioned inclination by at least one slot pitch.

5 Claims, 5 Drawing Figures

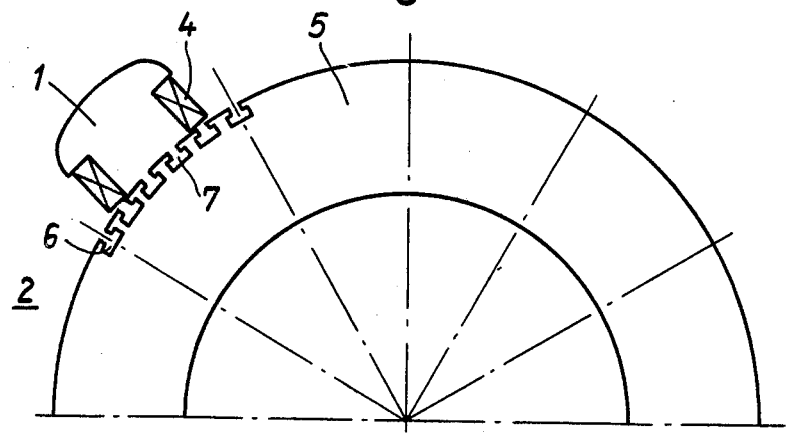
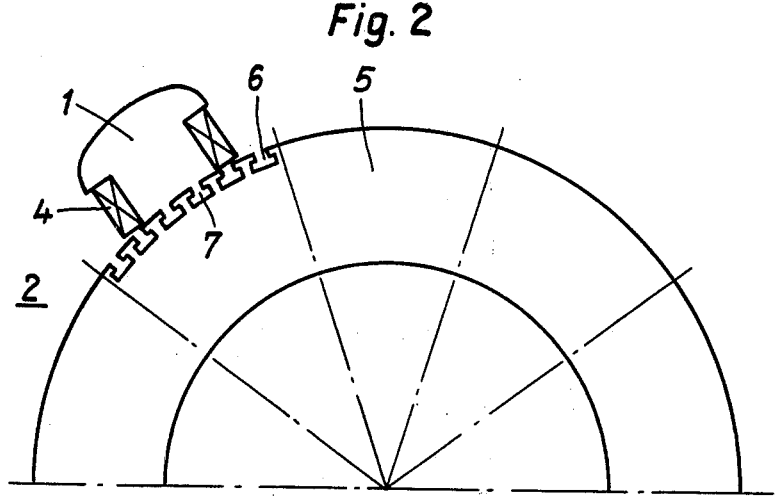

Fig. 5
Fig. 4
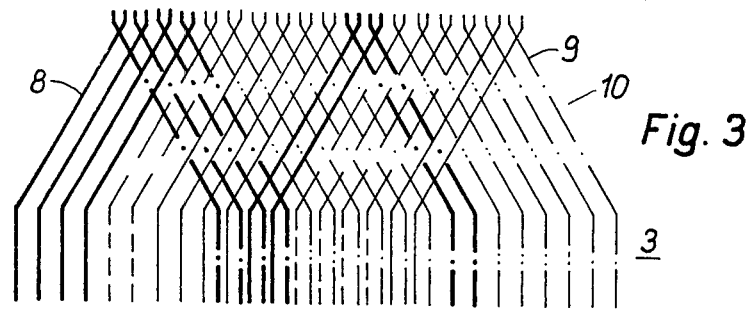
Fig. 3

ELECTRIC MACHINE HAVING POLES SWITCHABLE FOR OPERATION AT FREQUENCIES OF 50 HZ AND 60 HZ

BACKGROUND OF THE INVENTION

The invention relates to a synchronous electric machine having poles switchable for 50 and 60 Hz. The machine has a rotor with salient exciter poles. The circumference of the rotor has room for the number of exciter poles appropriate for the greater number of switchable poles, the exciter poles being configured according to the required exciter current and the magnetic flux for the smaller number of switchable poles. On the rotor ring body are provided fastening means, in particular slots, to assure a symmetrical arrangement of the poles for either number of poles. The machine further includes a switchable stator winding.

Such a switchable synchronous electric machine is known from German Pat. No. 1,638,584. Machines of this type are needed if a power supply network operating at 50 Hz for example is to be changed over, after a certain time of operation, from 50 Hz to the other common frequency of 60 Hz. This requires that the power producing generators be adapted to the new frequency as to their number of poles in their stator and rotor because, generally, with the optimal efficiency of the driving turbine in mind, the speed is to remain unchanged. The exciter poles of the known synchronous machines with switchable poles are fastened by means of screws to a solid ring body and the fastening holes required for a symmetrical arrangement of the exciter poles for both operating modes, that is for both numbers of poles, are provided from the first. Accordingly, the adaptation is effected in a simple manner at the machine location by shifting the poles according to the desired number of poles. The same exciter poles are used for both numbers of switchable poles which, while this means a corresponding over-dimensioning at the higher number of switchable poles, is a disadvantage outweighed by the advantage of reduced stock keeping and of enabling the machine to furnish the same output at both frequencies.

The stator winding of the known machine includes a coil lap winding or bar lap winding configured for a substitute pole number lying between the two operating pole numbers. It is adaptable to the particular operating mode by appropriately changing the coil and switching connections in such a manner that the switching of the successive winding parts merely causes a change in the winding factor, but no big change in power output. However, in order to avoid ring conductors and too many switching connections, the stator winding of low-speed synchronous machines is often configured as a wave winding.

Accordingly, in a synchronous machine whose poles are switchable from 50 Hz to 60 Hz, it is an object of the invention to provide an improvement which includes a switchable stator winding which furnishes the same optimal power for both operating modes. It is another object of the invention to provide such an improvement wherein the stator winding can also be configured as a wave winding as well as a lap winding.

SUMMARY OF THE INVENTION

The improvement according to the invention is utilized in an electrical synchronous machine having a slotted stator and having a rotor equipped with salient poles which are adjustable in number to enable the machine to operate at 50 and 60 Hz. The number of poles for each of these frequencies defines a corresponding pole pitch. The rotor periphery defines a space of sufficient size to accommodate thereon the excitation poles corresponding to the larger number of poles, the excitation poles being configured for the excitation current and the magnetic flux required for the smaller number of poles. Attachment means secure the excitation poles to the rotor in a symmetrical arrangement for each number of the poles.

The improvement according to the invention includes a switchable stator winding having a plurality of coils arranged in the slots of the stator so as to be two coil sides deep thereby defining a two-layer symmetrical three-phase winding wherein the number of slots per pole per phase, q, is given by:

$$q = \frac{z}{n} \quad (n \geq 1)$$

where the numerator, z, is selected so as to be dividable by 6 without remainder of 50 Hz operation and by 5 without remainder for 60 Hz operation, and wherein at least one of the following conditions is satisfied:
  a. the number of slots per pole approximates 10 for 60 Hz operations and 12 for 50 Hz operations; and,
  b. approximates 5 for 60 Hz operations and 6 for 50 Hz operation.

The stator winding has winding heads at each end of the machine and each of the winding heads is made up of conductor rods having an inclination defining a winding pitch corresponding to the mean value of the pole pitch for 50 Hz operation and the pole pitch for 60 Hz operation. Each of the slots contains an upper conductor rod and a lower conductor rod defining the coil sides disposed therein. The upper conductor rods are respectively connected to the lower conductor rods, at least at one end of the machine, so as to deviate from the winding pitch corresponding to the inclination by at least one slot pitch.

Thus, the switchable stator winding according to the invention consists of a two-layer, symmetrical, three-phase winding with $q = z/n$ as the number of slots per pole and phase ($n \geq 1$). The numerator z is selected so that it is divisable without remainder by 6 at 50 Hz and by 5 at 60 Hz and that there results a number of slots per pole which approximates either 10 for 60 Hz operation and 12 for 50 Hz operation, or else 5 for 60 Hz operation and 6 for 50 Hz operation. The inclination of the bars in the winding head approximately correspond on both sides of the machine to one winding pitch of the mean value of both pole pitches, and each connection between an upper and lower bar deviates, at least on one machine end, by at least one slot pitch from the winding pitch corresponding to the inclination. In this way, the actual winding pitch is made shorter or longer in conformity with the pole pitch for the particular frequency of operation.

The stator winding according to the improvement of the invention can be constructed as a wave winding as well as a lap winding. By switching the connection between the upper and lower rod once, using the same components which are merely turned and aligned differently, a largely optimal winding pitch, and thus good power output, is achieved for both numbers of poles, and thus for both operating modes. Although the position of the required switching connections changes, the machine is utilized almost equally well with both numbers of poles. The technician working with the machine has at least two configuration possibilities for the stator winding for each number of poles, of which one requires switching on both machine ends and the other switching on one machine end only. From these possibilities he may select the one more favorable in regard to other conditions applying to the synchronous machine, such as cooling, for instance.

In general, a deviation of the winding pitch by one slot pitch each from the winding pitch corresponding to the bar inclination in the coil head will be provided. But if enough room is available for the insulation of the connection, two slot pitches may also be considered as the deviation. This increases the number of coil configuration possibilities.

The change-over of the rotor to the other operating mode is undertaken so that a portion of the exciter poles is removed and replaced in a symmetrical arrangement in the fastening means already existing for this purpose, omitting or adding exciter poles. It is advisable to provide the fastening means in such a manner as to make possible a variation of the air gap of the machine, for which purpose the desired machine parameters are adjustable for both operating modes. Switching of the exciter poles is possible, regardless of whether the ring body is solid and the exciter poles are comb-type poles or poles with T-head or dovetail fastening configurations, or whether the ring body consists of individual, overlapping laminations. In the case of such a ring body constructed as a lamination chain, it is advisable to provide fastening means in the form of slots, for example, six slots for each pole taken with respect to the pole pitch for 50 Hz operation. These slots are configured so that the fastening elements of the pole shank can be retained in them.

Although the invention is illustrated and described herein as an electric machine having poles switchable for operation at frequencies of 50 Hz and 60 Hz, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

FIG. 1 is a schematic diagram of the rotor of a synchronous machine equipped with the improvement according to the invention. This view shows the mounting of an excitation pole thereon for a 60 Hz operation.

FIG. 2 is a schematic diagram of the synchronous machine of FIG. 1 equipped for operation at 50 Hz.

FIG. 3 is a schematic diagram of a portion of the stator winding according to the improvement of the invention.

FIG. 4 shows the position of the connections between upper and lower rods of the stator winding for operation at 60 Hz.

FIG. 5 shows the connections between the upper and lower rods of the stator winding for 50 Hz operation.

DESCRIPTION OF THE PREFERRED EMBODIMENTS OF THE INVENTION

An electric synchronous machine with salient exciter poles 1 in its rotor 2 is to be used, at a speed of 600 RPM, for a frequency of 60 Hz as well as a frequency of 50 Hz. However, this frequency change-over occurs only once, or at very long time intervals, such as when required by a network change-over. The resultant adaptation of the rotor 2 and stator winding 3 (FIG. 3) is made at the installation site of the synchronous machine.

Because of the speed of 600 RPM, there are provided on the rotor 2 twelve exciter poles 1 for 60 Hz operation and 10 exciter poles 1 for 50 Hz operation. The dimensions of the exciter poles 1 and of the exciter winding 4 are configured in accordance with the required exciter current and the magnetic flux for 50 Hz operation, that is, for 10 poles. The exciter poles 1 are supported by a lamination chain 5, constructed of overlapping, stacked laminations and provided along its outside diameter with uniformly distributed fastening slots 6 in such a manner that each pole pitch for 50 Hz operation (FIG. 2) contains six fastening slots 6. Each exciter pole 1 is fastened by means of T-head fastening means 7 corresponding in form to the fastening slots 6, each fastening means 7 fitting into two fastening slots 6. When changing over from one operating mode to the other, such as from 60 Hz to 50 Hz, two of the twelve exciter poles 1 provided on the rotor 2 are removed completely, and nine of the remaining ten exciter poles 1 are shifted in circumferential direction by one, two, three etc. rotor slot pitches, in order to establish a symmetrical arrangement of ten exciter poles 1 in the rotor 2.

The three-phase stator winding 3, configured in the form of a two-layer bar wave winding, meets the criteria imposed by the invention and is thus suited to be connected in the 600 RPM synchronous machine for a 60 Hz frequency as well as for a 50 Hz frequency and yet perform equally well. The stator winding 3 is configured for 60 Hz operation as an integral slot winding with a number of slots per pole per phase $q_{60} = 3$ and, for 50 Hz operation, as fractional-slot winding with a number of slots per pole per phase $q_{50} = 3\ 3/5$. For both operating modes, this results in a total number of slots N = 108, and the number of slots per pole for 60 Hz operation is 3 $q_{60}=9$ slots per pole and for 50 Hz operation 3 $q_{50} = 10\ 4/5$ slots per pole. In the wave winding, this corresponds to a winding pitch of 9 slot pitches for 60 Hz operation, and a winding pitch of 11 slot pitches for 50 Hz operation.

Two bars of the stator winding 3 are contained in each slot, the upper bar 8 and the lower bar 9, the lower bar 9 being shown by broken line in FIG. 3. In the coil head 10, all bars are uniformly offset with an inclination approximately corresponding to one winding pitch of the mean value of both pole pitches. All upper bars 8 are offset in one direction (to the right in FIG. 3), and the lower bars 9 are offset in the other direction, so that a direct radial connection between the mutually adjacent ends of a lower bar 9 and an upper bar 8 would correspond to a winding pitch of 10 slot pitches in the coil head 10. But in the stator winding 3 of the synchronous machine constructed in accordance with the invention, the connection between the upper bar 8 and lower bar 9 deviates from the radial connection. The respective connecting parts 11 are disposed obliquely so as to deviate by one slot pitch, that is, the winding pitch is shortened by one slot pitch (FIG. 4) for 60 Hz operation as compared to the existing bar inclination in the coil head 10, thus resulting in nine slot pitches; and, the winding pitch is lengthened by one slot pitch (FIG. 5) for 50 Hz operation, thus resulting in 11 slot pitches. Accordingly, the winding pitch for each operating mode corresponds approximately to the pole pitch so that an optimal coil configuration is achieved.

What is claimed is:

1. In an electrical synchronous machine having a slotted stator and having a rotor equipped with salient poles which are adjustable in number to enable the machine to operate at 50 and 60 Hz, the number of poles for each of said frequencies defining a corresponding pole pitch, the rotor periphery defining a space of sufficient size to accommodate thereon the excitation poles corresponding to the larger number of poles, the excitation poles being configured for the excitation current, and the magnetic flux required for the smaller number of poles, attachment means for securing the excitation poles to the rotor in a symmetrical arrangement for each number of the poles, wherein the improvement comprises: a switchable stator winding having a plurality of coils arranged in the slots of the stator so as to be two coil sides deep thereby defining a two-layer symmetrical three-phase winding wherein the number of slots per pole per phase, $q$, is given by:

$$q = \frac{z}{n} (n \geq 1)$$

where the numerator, $z$, is selected so as to be dividable by 6 without remainder of 50 Hz operation and by 5 without remainder for 60 Hz operation, and wherein at least one of the following conditions is satisfied:
 a. the number of slots per pole approximates 10 for 60 Hz operations and 12 for 50 Hz operations: and,
 b. approximates 5 for 60 Hz operations and 6 for 50 Hz operation;
the stator winding having winding heads at each end of the machine, each of the winding heads being made up of conductor rods having an inclination defining a winding pitch corresponding to the mean value of the pole pitch for 50 Hz operation and the pole pitch for 60 Hz operation; and, each of said slots containing an upper conductor rod and a lower conductor rod defining the coil sides disposed therein, the upper conductor rods being respectively connected to the lower conductor rods, at least at one end of the machine, so as to deviate from the winding pitch corresponding to said inclination by at least one slot pitch.

2. The improvement of claim 1, said attachment means comprising slots formed in the rim of the rotor for mounting the excitation poles therein to achieve said symmetrical arrangement of the excitation poles.

3. The improvement of claim 2 for 60 Hz operation, the winding pitch determined by the connections between said upper conductor bars and said lower conductor bars being shortened by at least one slot pitch compared to said winding pitch corresponding to said inclination of said conductor rods in said winding heads.

4. The improvement of claim 3 wherein the rotor includes a lamination chain made up of overlapped laminated metal sheets whereon the excitation poles are attached, and wherein the improvement furhter comprises said slots of the rotor being uniformly distributed about the outer peripheral surface of the laminated chain such that six slots are provided per pole pitch corresponding to 50 Hz operation.

5. The improvement of claim 2 wherein the rotor includes a lamination chain made up of overlapped laminated metal sheets whereon the excitation poles are attached, and wherein the improvement further comprises said slots of the rotor being uniformly distributed about the outer peripheral surface of the laminated chain such that six slots are provided per pole pitch corresponding to 50 Hz operation.

\* \* \* \* \*